June 25, 1946.　　　H. W. LEVERENZ　　　2,402,762
METHOD AND APPARATUS FOR PORTRAYING INTELLIGENCE
Filed Nov. 20, 1942　　　2 Sheets-Sheet 1

Inventor
HUMBOLDT W. LEVERENZ
By Charles McClair
Attorney

June 25, 1946.　　　H. W. LEVERENZ　　　2,402,762
METHOD AND APPARATUS FOR PORTRAYING INTELLIGENCE
Filed Nov. 20, 1942　　　2 Sheets-Sheet 2

INVENTOR
HUMBOLDT W. LEVERENZ.
BY Charles McClair
ATTORNEY

Patented June 25, 1946

2,402,762

UNITED STATES PATENT OFFICE 2,402,762

METHOD AND APPARATUS FOR PORTRAYING INTELLIGENCE

Humboldt W. Leverenz, Princeton, N. J., assignor to Radio Corporation of America, a corporation of Delaware Application November 20, 1942, Serial No. 466,272

8 Claims. (Cl. 250—164)

My invention relates to cathode ray tube apparatus and methods of portraying intelligence and particularly to tubes and apparatus incorporating targets of the luminescent material or phosphor type and methods of operation thereof.

This application is a continuation in part of my copending application Serial No. 451,984, filed July 23, 1942. In my said copending application I described apparatus suitable for providing dark traces on an illuminated background representative of received intelligence. In the usual cathode ray tube the information to be portrayed is in the form of an illuminated trace on a dark background, it usually being considered that the intensity of the trace is directly proportional to the intensity of the electron beam. However, in certain radar applications it is desirable to provide a trace such as indicative of an aircraft position, distance and trajectory with respect to a receiving station and to maintain these indications for a period of time of the order of from several seconds to one minute. While it has been proposed to utilize alkali halide targets to provide a dark trace within an illuminated background, such targets do not give entirely satisfactory contrast over this desired period. Furthermore, in radar systems it is desirable to provide new information or intelligence superimposed upon "remembered" intelligence. For example, strong signals may be received from a horizon prior to a change in range or elevation so that upon change, the new horizon is higher than the old horizon, so that new information or intelligence sought to be portrayed is discernible only with difficulty until the remembered previous information has faded away.

Among the objects of my invention are to provide a more efficient dark trace tube and system for portraying transient phenomena over a relatively long period of time, to provide a tube and system having greater contrast than the previously used tubes and systems, to provide a method of portraying transient information over a relatively long period of time, and to provide means whereby an observer may distinguish subsequently received intelligence as contrasted with previously received intelligence or remembered information.

These and other objects, features, and advantages of my invention will be apparent from the following description of a specific cathode ray tube and system in combination with the accompanying drawings in which, Figure 1 shows a cathode ray tube incorporating a target structure and system made and operated in accordance with my invention;

In accordance with my invention, I provide a cathode ray tube having a luminescent or phosphor screen of such material that its variation of efficiency at elevated temperatures is different under corpuscular and radiant energy excitation and I uniformly excite the screen by radiant energy such as ultra-violet light, heat the screen substantially uniformly by heat from an auxiliary source such as by infra-red radiation, and bombard the screen with corpuscular energy, such as cathode rays, to produce a dark trace pattern of information on a brilliantly illuminated background. Further, in accordance with my invention, I maintain the average temperature of the screen so that it is near or above the optimum temperature for ultra-violet excited luminescence and I then increase the temperature such as by cathode rays to provide high intensity luminescence, whereupon the screen area excited by the cathode rays following excitation is reduced in luminescence to a value which is very low in comparison to the ultra-violet excitation notwithstanding continuous incidence of the ultra-violet energy.

Figure 1:
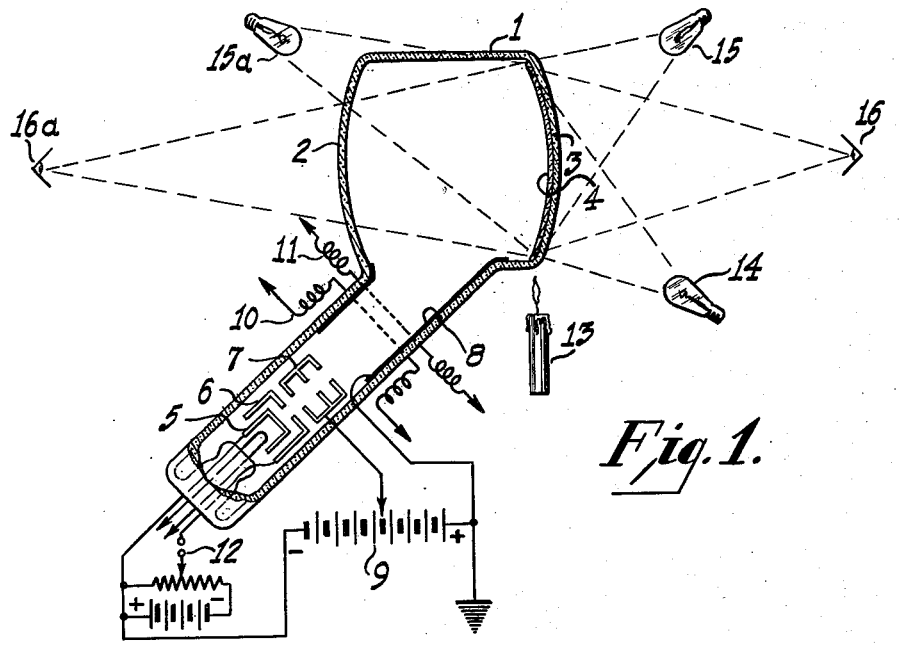

Referring to Figure 1, I have shown a cathode ray tube suitable for practicing my invention comprising an envelope 1 having oppositely disposed windows 2 and 3, the window 3 being coated on its inner surface with a screen 4 of luminescent material, various types of suitable luminescent material being described hereinafter. Alternatively, the screen 4 may be on a foundation separate from the envelope 1, for example on a sheet of mica. Such a construction provides greater heat insulation of the screen and may be of advantage in certain applications as described below. The envelope 1 is provided with a neck section enclosing a conventional electron gun oppositely disposed from the screen 4 comprising a cathode 5 which may be of the indirectly heated type, a control electrode or grid 6 maintained at a suitable bias with respect to the cathode, and first and second anodes 7 and 8 respectively operated at relatively high potentials with respect to the cathode 5 by a battery or other potential source 9. In addition, I provide means such as the deflection coils 10 and 11 for deflecting the electron beam developed by the electron gun such as in two mutually perpendicular directions over the screen 4. In operation the electron beam may be modulated in accordance with a received signal applied at the terminals 12 to provide intermittent pulsing or flow of a high current density electron beam for portraying the received information. In accordance with my invention, I maintain the screen at an average temperature of 50 to 400° C. and more preferably between 200 and 300° C. such as by an external heat source such as represented by the flame 13 which is shown merely as exemplary of such a heat source. Preferably the heat may be applied to the screen 4 by an infra-red energy source or lamp 14, and I then excite the screen 4 to high luminescence such as by ultraviolet radiation from the ultra-violet lamp 15, whereupon the screen may be viewed either from the position 16 or 16a. Alternatively, the screen 4 may be excited by ultra-violet light on the scanned side thereof, such as by an ultra-violet source 15a, whereupon the screen is preferably viewed from the position 16a.

In operation and as indicated above, the average temperature of the luminescent or phosphor screen 4 is adjusted so that the screen is operating near or above the optimum temperature for ultra-violet excited luminescence. I have found that various luminescent materials or phosphors have excitation characteristics such that the efficiency under one form of excitation drops more rapidly with increasing temperature than the drop in excitation under another form of excitation with identical increase in temperature. This observed characteristic of various luminescent materials is exemplified in Figure 2 wherein the ordinates of the curve UV—1 are representative of actual plotted values of luminescent efficiency at different temperatures plotted as abscissae for excitation of a copper-activated zinc cadmium sulphide screen excited by ultra-violet light. The dashed line curve CR of Figure 2, similarly plotted from observed data, is representative of the luminescent efficiency of the same screen material under cathode ray excitation. It will be noted that the break points E and M of the two curves UV and CR occur at different temperatures, these points being at approximately 180° C. and 305° C., respectively.

Figure 2:
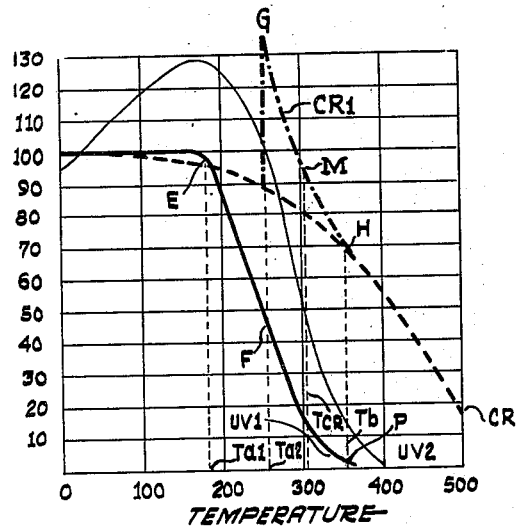
Figure 2 shows three curves of luminescent efficiency with respect to temperature of one type of luminescent material, such curves being useful in explaining the method of my invention.
Figure 4:
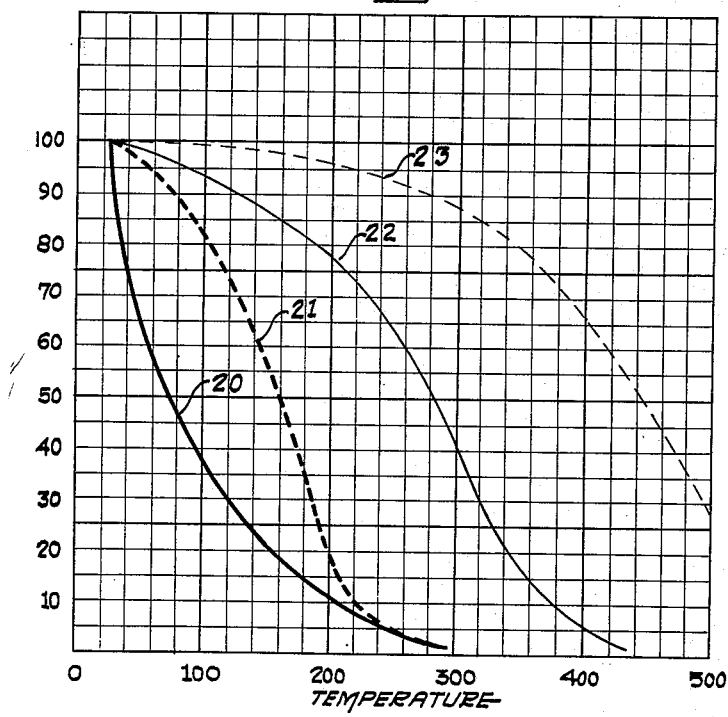
Figure 4 shows additional curves similar to those of Figure 2 but for different luminescent material.

Referring again to Figure 2, the average temperature of the screen 4 such as maintained by direct heating from the source 13 or incident from the source 14 may vary over a wide range and may be at $Ta1$, $Ta2$, or some higher temperature, but preferably not greatly exceeding $T_{CR}$, which is the temperature corresponding to the break point M for cathode ray excited luminescence. Preferably this temperature is at or near the break point for ultra-violet excitation which is that temperature at which the tangent to the efficiency-temperature curve UV—1 for ultra-violet excitation plotted on the coordinates shown in Figures 2 and 4 is substantially 30° to the abscissa.

The level of brilliancy acquired by the screen 4 under the incident ultra-violet radiation from either the source 15 or 15a is commensurate with the efficiency of the screen under such excitation at the chosen average temperature and with the intensity of the ultra-violet source. The cathode ray beam then excites the screen area upon which it impinges to even higher luminous intensity by virtue of two factors; (1) superimposed excitation by ultra-violet and cathode ray excitation, and (2) the higher temperature break point for cathode ray excitation as compared with ultraviolet excitation. However, when the cathode ray beam is moved to another screen element, such as by variation in the current carried by the deflection coils 10 and 11, a dark area will remain on the screen at the point of original incidence. However, upon rebombardment of the initially scanned area, the beam will again excite high luminous intensity in the residual dark area. The return of the cathode ray beam is thus signalized even though the screen area before the repeated cathode ray bombardment is much darker than its surrounding areas.

Figure 3:
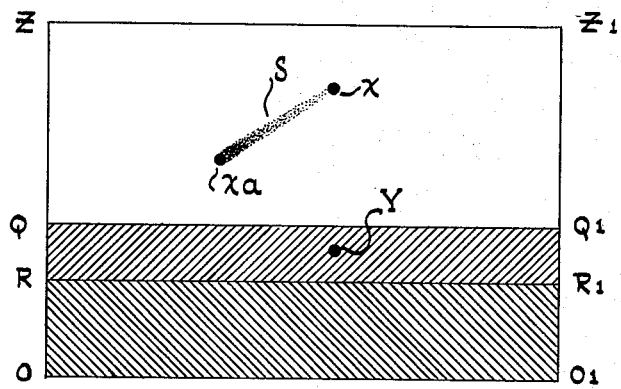
Figure 3 shows a raster form such as developed on the target of the tube of Figure 1.

The above mode of operation may be further explained by reference to Figures 2 and 3 assuming the phosphor screen efficiency with respect to temperature as represented by the curves UV—1 and CR for ultra-violet and cathode ray excitation respectively and an average screen temperature $Ta2$. Under such conditions the ultra-violet excitation will produce an amount of light proportional to the ordinant $Ta2$—F. However, when the cathode ray beam strikes a small area of the screen, such as the area X in Figure 3, the instantaneous fluorescent intensity will rise to a value represented by the ordinant $Ta2$—G. However, the cathode ray beam develops heat at the area X and the fluorescent intensity will follow the curve CR to the right and fall to a value determined by the heat capacity and radiating properties of the screen. For example, if the cathode ray beam heats the elemental area X to a temperature $Tb$, the instantaneous fluorescent intensity will be proportional to the ordinant $Tb$—H. If now the cathode ray beam is extinguished or moved to another elemental area on the screen, the fluorescent intensity of the previously bombarded and locally heated area X will fall to P on the UV curve rather than return to the point F occasioned by the incident ultra-violet energy. Consequently, notwithstanding continued ultra-violet energy incidence on the screen, the intensity will be less at the point X after bombardment by the cathode ray beam than before, and since surrounding areas not affected by the beam are highly excited by the ultra-violet radiation, the elemental area X will appear as a dark spot on an illuminated background. Furthermore, as the beam moves from the point X to a new point $Xa$, a dark trace S will be formed. As the heat imparted to the screen by the cathode ray beam over the dark trace S is dissipated either by radiation or conduction through the window 3, the luminescence of this area will increase by reason of ultra-violet excitation. Assuming that the electron beam following a short interval of time is returned to the point X, this elemental screen area will have fallen in temperature such as to $T_{CR}$. The returning beam then instantaneously raises the light intensity of the dark elemental area to a value represented by the ordinant $T_{CR}$—M whereupon the cycle is repeated, the temperature being raised during the first step of the second cycle by the cathode ray beam to $Tb$.

It will be appreciated from the above mode of operation that the rate of return of the elemental area following cathode ray excitation to a lower temperature is proportional to the temperature difference $Tb$—$Ta$ where $Ta$ is the average screen temperature and $Tb$ is the highest temperature attained by the elemental area under cathode ray bombardment. Hence the persistence and intensity of the dark trace may be controlled by varying the temperature difference $Tb—Ta$. In addition, each time the cathode ray beam impinges the area X, the luminescence produced by the beam is reduced below that occasioned under a previous bombardment until the heat loss by the area X equals the incremental heating produced by the beam. However, the excitation during each successive bombardment of the area X is greater than the excitation following each successive bombardment so that the luminescence following excitation by the beam is sufficiently low such as less than 75% of initial luminescence to produce the dark area observable by contrast with surrounding ultra-violet excited areas.

My method of portraying received information is particularly useful in calling attention to new information superimposed upon remembered old information in radar applications. For example, if the area $QQ_1OO_1$ in Figure 3 is occupied by strong signals, such as from objects below a horizon $QQ_1$, and the range of elevation be shifted so that the new horizon falls at $RR_1$, then new information falling in the area $QQ_1RR_1$ is discernible only with difficulty until the remembered previous information has faded away. By my method, however, new information sought to be portrayed in the area $QQ_1RR_1$ would be evidenced immediately by brilliant illumination followed by an intensified dark trace as the cathode ray beam is sequentially scanned over any section of the area $QQ_1RR_1$. In the foregoing example I have explained the operation as though the cathode ray beam is moved continuously over the dark trace, although it will be appreciated that this is representative only of the visual effect. Actually, I scan the beam over the entire raster area, such as represented by the area $ZZ_1OO_1$, while the beam is maintained at a low or zero intensity in a manner similar to television scanning. At the point X however or other points to be portrayed, such as along the dark trace S during its formation, I pulse the cathode ray beam, the pulsing being exceedingly rapid in comparison to the scanning time, so that an elemental area of light followed by a dark area is formed.

As a particular example of suitable operating conditions and materials, I may provide a zinc cadmium sulphide screen having a ratio of 88 parts zinc to 12 parts cadmium by weight activated with 0.008% copper, the curves of Figure 2 being plotted from data on such a screen, and maintain the average temperature between 50 and 400° C., although I preferably maintain this temperature between 200 and 300° C. I then excite the screen with ultra-violet light derived from a commercial CH–4 mercury vapor lamp (3650 A.) and bombard the screen with electrons having a velocity between 1000 and 60,000 volts with sufficient beam current to provide useful dark traces in the scanning time interval with respect to the unit electron beam area. For example, I have found that an electron beam at 6000 volts velocity and with a current intensity of 30 microamperes focused over an elemental screen area of two square millimeters will darken the screen in less than one second and provide a suitable dark trace for information portrayal.

While I have specifically referred to a zinc cadmium sulphide phosphor screen, various other luminescent sulphides and selenides may be used, such as, for example, zinc sulphide, cadmium sulphide, or the sulpho-selenides of these metals. Furthermore, oxygen-containing phosphors such as manganese-activated zinc silicate, zinc beryllium silicate, or borates or aluminates of the periodic system group II metals may be used to equal advantage, although such oxygen-containing phosphors should be excited by 2537 A. rather than at 3650 A. Where germanate phosphors are used, either or both 2537 A. and 3650 A. may be used. The curves shown in Figure 2 are representative of actual plotted data with a screen material of copper activated zinc cadmium sulphide as indicated above, and I have shown in Figure 4 similarly plotted curves for other types of luminescent material. Referring to Figure 4, the curves 20 and 21 are representative of luminescent efficiency with respect to temperature for ultra-violet and cathode ray excitation of a silver activated zinc sulphide in a tube such as shown in Figure 1. It will be noted that the characteristics of this material are likewise suitable for practicing my invention. I have also shown in Figure 4 similar curves 22 and 23 corresponding to the curves 20—21 but representative of actual plotted data recovered from a manganese activated zinc silicate screen material. It will be noted that these curves likewise show that zinc silicate phosphor material is suitable for practicing my invention. All of the data with respect to the curves previously described in Figures 2 and 4 were taken operating the screen in a vacuum in a tube of the type shown in Figure 1. For comparison with the curve UV—1, I have shown in Figure 2 another curve UV—2 showing luminescent efficiency with respect to temperature for the zinc cadmium sulphide material excited to high luminescence in air by ultra-violet light. It will be noted that the slope of this curve is somewhat different from the corresponding curves 20 and 22 although it is nevertheless suitable for obtaining my objects. For example, such a screen may be provided on the outside surface of a thin walled tube excited by ultra-violet light and scanned by Lenard rays projected through the wall of the tube to provide the dark trace in accordance with my method.

From the above description of my invention, it will be apparent that the essence thereof is to utilize the different temperature variations of efficiency under cathode ray and ultra-violet excitation in order to produce dark trace images of controllable persistence and contrast and to further provide means for calling attention to new information by producing a bright flash of fluorescence in a screen element which is still darkened with respect to surrounding fluorescing areas. It will be appreciated that the practice of my method of portraying intelligence is not limited to the specific structural embodiments of my cathode ray tube and system, but that my method can be performed by manual means. For example, a cathode ray beam may be formed by a manually supported electron source manually scanned over a luminescent material screen of any of several different materials as described above while simultaneously heating the screen such as by manually contacting the screen foundation to maintain it at a temperature over 50° C. while simultaneously exciting the screen with radiant energy such as ultra-violet light. Furthermore, it will be appreciated that I am not limited in practicing my invention to the specific embodiments hereof as set forth above except as set forth and specifically defined in the appended claims.

I claim:

1. The method of portraying dark traces representative of received information on a luminescent screen comprising heating the screen to a temperature between 50 and 400° C., subjecting said screen to ultra-violet light whereby said screen is uniformly excited to luminescence, heating an elemental area of said screen through small progressively increasing temperature steps with a beam of electrons and simultaneously increasing and then decreasing the excitation to luminescence produced by said beam during the initial and successive heating steps to form a darkened area on said screen.

2. The method of portraying dark traces representative of received information on a luminescent screen comprising heating the screen to a temperature between 50 and 400° C., subjecting said screen to ultra-violet light excitation whereby said screen is uniformly excited to luminescence, initially exciting an elemental area of said screen to fluorescence by cathode rays, successively exciting said area by cathode rays to fluorescence to progressively decreasing intensities and interrupting said excitation of said elemental area by cathode rays while maintaining said ultra-violet excitation substantially constant to form a darkened area on said screen.

3. The method of portraying received information on a cathode ray tube incorporating a luminescent screen comprising heating the screen to a temperature between 50 and 400° C., exciting the screen with ultra-violet light, heating successively displaced elemental areas of the screen through successively increasing temperature steps to a temperature at which the luminous excitation by ultra-violet is reduced while simultaneously exciting the said elemental areas to an initially high luminescence followed by successively decreasing intensity fluorescence thereby forming darkened elemental areas observable by contrast with surrounding areas excited by said ultra-violet light.

4. The method of portraying received information on a cathode ray tube incorporating a luminescent screen comprising heating the screen to a temperature at which the efficiency of said screen under ultra-violet light is a predetermined amount less than at room temperature, exciting the screen with ultra-violet light, progressively and by incremental steps, heating an elemental area of the screen to a temperature at which the efficiency of said screen under excitation by said ultra-violet is less than said predetermined amount and simultaneously exciting the said elemental area to high and progressively smaller luminescence as said area is heated to form a darkened area observable by contrast with surrounding areas while maintaining said ultra-violet light substantially constant.

5. The method of developing dark traces on a cathode ray tube having an electron gun to develop an electron beam and a luminescent screen comprising heating the screen to a temperature between 200 and 300° C., continuously exciting said screen with ultra-violet light, scanning said beam at low intensity over the excited area of said screen increasing the intensity of said beam during successive scansions thereof while incident upon an elemental area of said screen to further excite to luminescence and simultaneously heat said elemental area by small increasing increments of temperature to an elevated temperature at which said ultra-violet light is ineffective in materially exciting said area, whereby the fluorescence of said screen under incident electrons gradually decreases and the said elemental area is observable as a dark area in contrast to the luminescence produced by continuous excitation of said screen with ultra-violet light.

6. The method of developing dark traces on a cathode ray tube having an electron gun to develop an electron beam and a luminescent screen comprising heating the screen to a temperature between 200 and 300° C., continuously exciting said screen with ultra-violet light, scanning said beam at low intensity over the excited area of said screen, increasing the intensity of said beam during successive scansions thereof while incident upon an elemental area of said screen to initially further excite to luminescence said elemental area and simultaneously gradually heat said area to an elevated temperature at which said ultra-violet light is ineffective in materially exciting said area, increasing the intensity of said beam during following successive scansions thereof while incident upon elemental areas progressively removed from said first mentioned area of said screen to further initially excite and heat said progressively removed areas whereby a dark trace is produced over said elemental areas observable by contrast with respect to the continuous excitation of said screen with ultra-violet light.

7. Apparatus for portraying information comprising a cathode ray tube having an electron gun to develop an electron beam and a luminescent screen, ultra-violet light means to excite said screen to high luminescence, means to heat said screen to a temperature at which the maximum excitation by said ultra-violet light is reduced to a predetermined amount, and means to sequentially heat and simultaneously excite to luminescence displaced elemental areas of said screen with cathode ray energy of said beam to form a dark trace surrounded by luminescence produced by excitation by said ultra-violet light.

8. Cathode ray apparatus comprising a tube having means to develop a cathode ray beam and a luminescent screen, means to heat said screen to a temperature above room temperature and to a temperature at which said screen has a lower luminescence efficiency under excitation by ultra-violet light than under cathode rays, for generating and directing ultra-violet light onto said screen to excite it to luminescence, means to scan said beam over said screen, and means to momentarily increase the intensity of said beam sufficiently to heat displaced elemental areas thereof to a temperature at which luminescence under said ultra-violet excitation is reduced to a value less than 75% of that produced by said beam whereby following said momentary increase in intensity the said areas are observable as a dark trace on a luminescent background.

HUMBOLDT W. LEVERENZ.